(12) United States Patent
Huang et al.

(10) Patent No.: US 9,919,456 B2
(45) Date of Patent: Mar. 20, 2018

(54) METHOD FOR PRODUCING OPHTHALMIC LENSES

(71) Applicant: Novartis AG, Basel (CH)

(72) Inventors: Horngyih Huang, New Taipei (TW); Honghui Lu, Johns Creek, GA (US)

(73) Assignee: Novartis AG, Basel (CH)

( * ) Notice: Subject to any disclaimer, the term of this patent is extended or adjusted under 35 U.S.C. 154(b) by 626 days.

(21) Appl. No.: 14/527,830

(22) Filed: Oct. 30, 2014

(65) Prior Publication Data

US 2015/0115485 A1   Apr. 30, 2015

Related U.S. Application Data

(60) Provisional application No. 61/898,000, filed on Oct. 31, 2013.

(51) Int. Cl.

| | |
|---|---|
| *B29C 33/64* | (2006.01) |
| *B29C 33/62* | (2006.01) |
| *B29C 35/08* | (2006.01) |
| *B29C 33/60* | (2006.01) |
| *B29D 11/00* | (2006.01) |
| *G02B 1/04* | (2006.01) |
| *B29L 11/00* | (2006.01) |
| *B29K 83/00* | (2006.01) |

(52) U.S. Cl.
CPC .............. *B29C 33/62* (2013.01); *B29C 33/60* (2013.01); *B29C 33/64* (2013.01); *B29C 35/0805* (2013.01); *B29D 11/00192* (2013.01); *B29D 11/00865* (2013.01); *B29C 2035/0833* (2013.01); *B29K 2083/005* (2013.01); *B29K 2995/0092* (2013.01); *B29L 2011/0041* (2013.01)

(58) Field of Classification Search
CPC .......... B29C 33/60; B29C 33/62; B29C 33/64
See application file for complete search history.

(56) References Cited

U.S. PATENT DOCUMENTS

| | | | |
|---|---|---|---|
| 3,484,271 A * | 12/1969 | Kaliski | D21H 19/14 427/391 |
| 4,136,250 A | 1/1979 | Mueller | |
| 4,153,641 A | 5/1979 | Deichert | |
| 4,159,292 A | 6/1979 | Neefe | |
| 4,182,822 A | 1/1980 | Chang | |
| 4,185,087 A | 1/1980 | Morlino | |
| 4,189,546 A | 2/1980 | Diechert | |
| 4,254,248 A | 3/1981 | Friends | |
| 4,259,467 A | 3/1981 | Keogh | |
| 4,260,725 A | 4/1981 | Keogh | |
| 4,261,875 A | 4/1981 | LeBoeuf | |
| 4,276,402 A | 6/1981 | Chromecek | |
| 4,327,203 A | 4/1982 | Diechert | |
| 4,341,889 A | 7/1982 | Diechert | |
| 4,343,927 A | 8/1982 | Chang | |
| 4,355,147 A | 10/1982 | Diechert | |
| 4,444,711 A | 4/1984 | Schad | |
| 4,460,534 A | 7/1984 | Boehm | |
| 4,486,577 A | 12/1984 | Mueller | |
| 4,534,916 A | 8/1985 | Wichterle | |
| 4,543,398 A | 9/1985 | Bany | |
| 4,605,712 A | 8/1986 | Mueller | |
| 4,661,575 A | 4/1987 | Tom | |
| 4,684,538 A | 8/1987 | Klemarczyk | |
| 4,703,097 A | 10/1987 | Wingler | |
| 4,833,218 A | 5/1989 | Lee | |
| 4,837,289 A | 6/1989 | Mueller | |
| 4,929,707 A | 5/1990 | Nagata | |
| 4,946,923 A | 8/1990 | Nagata | |
| 4,954,586 A | 9/1990 | Toyoshima | |
| 4,954,587 A | 9/1990 | Mueller | |
| 5,010,141 A | 4/1991 | Mueller | |
| 5,013,496 A | 5/1991 | Nagata | |
| 5,021,503 A | 6/1991 | Nagata | |
| 5,034,461 A | 7/1991 | Lai | |
| 5,039,761 A | 8/1991 | Ono | |
| 5,070,170 A | 12/1991 | Robertson | |
| 5,079,319 A | 1/1992 | Mueller | |
| 5,126,388 A | 6/1992 | Nagata | |
| 5,165,994 A | 11/1992 | Kaler | |
| 5,264,161 A | 11/1993 | Druskis | |

(Continued)

FOREIGN PATENT DOCUMENTS

| | | |
|---|---|---|
| EP | 0367513 B1 | 7/1995 |
| EP | 0958315 B1 | 6/2001 |

(Continued)

OTHER PUBLICATIONS

Siltech Corporation Brochure titled "Innovative Silicone Specialties", Archived from www.siltech.com/index.php/silicone-quaternary-compounds-silquat to 2003, Retrieved Dec. 7, 2016.*
PCT International Search Report dated Feb. 3, 2015, International Application No. PCT/US2014/063027, International Filing Date Oct. 30, 2014.
PCT Written Opinion of the International Searching Authority dated Feb. 3, 2015, International Application No. PCT/US2014/063027, International Filing Date Oct. 30, 2014.
Authors: Eduardo F. Marques, Oren Regev, Ali Khan, Maria Da Graca Miguel, and Björn Lindman Title: Vesicle Formation and General Phase Behavior in the Catanionic Mixture SDS-DDAB-Water. The Anionic-Rich Side Published: J. Phys. Chem. B, 1998, vol. 102, pp. 6746-6758.

(Continued)

*Primary Examiner* — Atul P. Khare
(74) *Attorney, Agent, or Firm* — Jian Zhou

(57) ABSTRACT

The invention provides a method for producing ophthalmic lenses, preferably contact lenses, more preferably silicone hydrogel contact lenses. This method involves applying a coat of catanionic vesicles onto the molding surfaces of a mold. By having a coat of catanionic vesicles on the molding surfaces of a mold, mold separation force and lens defects generated during mold opening and de-molding process can be substantially reduced.

15 Claims, No Drawings

(56) References Cited

U.S. PATENT DOCUMENTS

| | | | |
|---|---|---|---|
| 5,308,393 A * | 5/1994 | Hattich | B29C 33/60 106/243 |
| 5,346,946 A | 9/1994 | Yokoyama | |
| 5,358,995 A | 10/1994 | Lai | |
| 5,387,632 A | 2/1995 | Lai | |
| 5,416,132 A | 5/1995 | Yokoyama | |
| 5,451,617 A | 9/1995 | Lai | |
| 5,486,579 A | 1/1996 | Lai | |
| 5,508,317 A | 4/1996 | Müller | |
| 5,527,925 A | 6/1996 | Chabrecek | |
| 5,542,978 A | 8/1996 | Kindt-Larsen | |
| 5,583,163 A | 12/1996 | Müller | |
| 5,594,088 A | 1/1997 | Nagata | |
| 5,612,389 A | 3/1997 | Chabrecek | |
| 5,612,391 A | 3/1997 | Chabrecek | |
| 5,621,018 A | 4/1997 | Chabrecek | |
| 5,665,840 A | 9/1997 | Pöhlmann | |
| 5,712,356 A | 1/1998 | Bothe | |
| 5,753,730 A | 5/1998 | Nagata | |
| 5,789,464 A | 8/1998 | Müller | |
| 5,843,346 A | 12/1998 | Morrill | |
| 5,849,810 A | 12/1998 | Müller | |
| 5,849,841 A | 12/1998 | Mühlebach | |
| 5,894,002 A | 4/1999 | Boneberger | |
| 5,936,052 A | 8/1999 | Bothe | |
| 5,962,548 A | 10/1999 | Vanderlaan | |
| 5,981,675 A | 11/1999 | Valint, Jr. | |
| 6,039,913 A | 3/2000 | Hirt | |
| 6,165,408 A | 12/2000 | Steinmann | |
| 6,203,909 B1 | 3/2001 | Chassot | |
| 6,221,303 B1 | 4/2001 | Steinmann | |
| 6,303,687 B1 | 10/2001 | Müller | |
| 6,342,570 B1 | 1/2002 | Bothe | |
| 6,367,929 B1 | 4/2002 | Maiden | |
| 6,451,871 B1 * | 9/2002 | Winterton | C08J 7/047 264/1.32 |
| 6,472,489 B1 | 10/2002 | Stockinger | |
| 6,479,587 B1 | 11/2002 | Stockinger | |
| 6,492,478 B1 | 12/2002 | Steinmann | |
| 6,627,124 B1 | 9/2003 | Herbrechtsmeier | |
| 6,719,929 B2 | 4/2004 | Winterton | |
| 6,762,264 B2 | 7/2004 | Künzler | |
| 6,793,973 B2 | 9/2004 | Winterton | |
| 6,800,225 B1 | 10/2004 | Hagmann | |
| 6,811,805 B2 | 11/2004 | Gilliard | |
| 6,822,016 B2 | 11/2004 | McCabe | |
| 6,849,210 B2 | 2/2005 | Bothe | |
| 6,896,926 B2 | 5/2005 | Qiu | |
| 7,091,283 B2 | 8/2006 | Müller | |
| 7,238,750 B2 | 7/2007 | Müller | |
| 7,268,189 B2 | 9/2007 | Müller | |
| 7,329,415 B2 * | 2/2008 | Lally | G02B 1/043 424/429 |
| 7,384,590 B2 | 6/2008 | Kelly | |
| 7,387,759 B2 | 6/2008 | Kelly | |
| 7,521,519 B1 | 4/2009 | Hirt | |
| 7,605,190 B2 | 10/2009 | Moszner | |
| 7,780,879 B2 * | 8/2010 | Pruitt | B29C 33/60 264/1.36 |
| 7,858,000 B2 * | 12/2010 | Winterton | B29D 11/00076 264/1.38 |
| 7,977,430 B2 | 7/2011 | Devlin | |
| 8,147,897 B2 | 4/2012 | Ferreiro | |
| 8,163,206 B2 | 4/2012 | Chang | |
| 8,409,599 B2 | 4/2013 | Wu | |
| 8,440,735 B2 * | 5/2013 | Pruitt | B29C 33/60 522/148 |
| 8,557,940 B2 | 10/2013 | Chang | |
| 8,993,651 B2 | 3/2015 | Chang | |
| 2004/0082680 A1 | 4/2004 | Phelan | |
| 2005/0008676 A1 * | 1/2005 | Qiu | A61L 27/34 424/429 |
| 2008/0015315 A1 | 1/2008 | Chang | |
| 2008/0143003 A1 | 6/2008 | Phelan | |
| 2008/0143958 A1 | 6/2008 | Medina | |
| 2008/0231798 A1 | 9/2008 | Zhou | |
| 2008/0234457 A1 | 9/2008 | Zhou | |
| 2010/0119755 A1 * | 5/2010 | Chung | B29C 59/021 428/36.91 |
| 2011/0134387 A1 | 6/2011 | Samuel | |
| 2012/0026457 A1 | 2/2012 | Qiu | |
| 2012/0088843 A1 | 4/2012 | Chang | |
| 2012/0088844 A1 | 4/2012 | Kuyu | |
| 2012/0088861 A1 | 4/2012 | Huang | |
| 2013/0118127 A1 | 5/2013 | Kolluru | |
| 2014/0171539 A1 | 6/2014 | Chang | |
| 2014/0171542 A1 | 6/2014 | Chang | |
| 2014/0171543 A1 | 6/2014 | Chang | |
| 2015/0092155 A1 | 4/2015 | Chang | |

FOREIGN PATENT DOCUMENTS

| | | |
|---|---|---|
| EP | 0932635 B1 | 7/2001 |
| EP | 0961941 B1 | 4/2002 |
| WO | 87/04390 A1 | 7/1987 |
| WO | 99/35520 A1 | 7/1999 |
| WO | 00/31150 A1 | 6/2000 |
| WO | 03/095171 A1 | 11/2003 |
| WO | 2012/078457 A1 | 6/2012 |

OTHER PUBLICATIONS

Authors: Srinivasa R. Raghavan, Gerhard Fritz, and Eric W. Kaler Title: Wormlike Micelles Formed by Synergistic Self-Assembly in Mixtures of Anionic and Cationic Surfactants Published: Langmuir 2002, vol. 18, pp. 3797-3803.

Authors: Sara B. Lioi, Xiang Wang, Mohammad R. Islam, Emily J. Danoff and Douglas S. English Title: Catanionic surfactant vesicles for electrostatic molecular sequestration and separation Published: Physical Chemistry Chemical Physics, 2009, vol. 11, pp. 9315-9325.

English Translation of Chinese Office Action dated Jul. 24, 2017, for Chinese Patent Application No. 201480057881.9, 5 Pages.

European Patent Office Communication Pursuant to Rules 161 and 162 EPC dated Jul. 5, 2016, for European Patent Application No. 14800195.1, 2 Pages.

* cited by examiner

METHOD FOR PRODUCING OPHTHALMIC LENSES

This application claims the benefits under 35 USC § 119 (e) of U.S. provisional application No. 61/898,000 filed Oct. 31, 2013, incorporated by reference in its entirety.

BACKGROUND

The present invention is related to a method for producing ophthalmic lenses, especially contact lenses, with an enhanced product quality and yield. In particular, the present invention is related to a method for facilitating mold separation and lens removal from a mold, preferably a reusable mold, in a cast-molding process of ophthalmic lenses (preferably contact lenses), thereby enhancing the quality and yield of produced ophthalmic lenses (contact lenses).

Contact lenses can be manufactured economically in a mass production manner by a conventional cast-molding process involving disposable molds (e.g., PCT published patent application No. WO/87/04390, EP-A 0 367 513, U.S. Pat. No. 5,894,002) or by the so-called Lightstream Technology™ (Alcon) which involving reusable molds and curing a lens-forming composition under a spatial limitation of actinic radiation (U.S. Pat. Nos. 5,508,317, 5,583,163, 5,789,464, 5,849,810, and 8,163,206). The Lightstream Technology™ (Alcon) is an improved cast-molding process for cast molding of hydrogel contact lenses with high precision, fidelity and reproducibility and at low cost. A critical step in the production of lenses using disposable or reusable molds is mold opening and lens releasing from the mold without damaging the lens. Subsequent to the completion of the contact lens molding process, the polymerized lens is in the swollen state in an organic solvent before the organic solvent being exchanged into water and has very low stiffness and toughness. Further, the polymerized lens tends to strongly adhere to the mold. As such, during mold opening and lens demolding (i.e., removing the contact lenses from the mold), cracks, flaws and/or tears may occur in the lenses or in the worst case the contact lenses even break totally. Contact lenses having such defects have to be discarded and lower the overall production yield.

Several methods have been developed or proposed for mold opening and lens demolding. One method for releasing lenses is to hydrate the lens, namely, a lens-in-mold assembly after mold separation is placed in a hydration tank filled with water. Often hydration alone does not release the lenses from the molds. The lenses must then be gently removed from molds by hand. Such hand-assisted lens removal increases the likelihood of lens damage. U.S. Pat. No. 5,264,161 discloses an improved method for releasing a lens from a mold, in which surfactants are added to the hydration bath to facilitate the release of lenses from molds. However, the utilization of surfactants in a hydration bath does not provide a more effortless mold separation. Lens damage incurred during mold separation may not be minimized by hydrating lenses.

Another method of lens release is to incorporate surfactants as internal mold releasing agents into molds themselves as illustrated by U.S. Pat. No. 4,159,292. Incorporation of internal mold releasing agents in molds can decrease adhesion between lenses and molds. However, when a mold is used repeatedly, surfactants as internal mold releasing agent can be exhausted by exudation.

A further method of lens release is to apply external mold releasing agents (e.g., surfactants) in the form of a film or coating onto to the molding surfaces of a mold (e.g., those disclosed in U.S. Pat. Nos. 4,929,707 and 5,542,978 and PCT publication No. WO03095171). When external mold releasing agents are used, a portion of the agents used for treating the molding surfaces of the mold can migrate to the surface and interior of the polymerized lens.

A still further method of lens release is to incorporate internal mold releasing agents into a lens-forming composition for making contact lenses. The internal mold releasing agent can be a surfactant (U.S. Pat. Nos. 4,534,916, 4,929,707, 4,946,923, 5,013,496, 5,021,503, 5,126,388, 5,594,088, 5,753,730), a non-polymerizable polymer (U.S. Pat. No. 6,849,210), or a phospholipid (U.S. Pat. No. 8,440,735). By incorporation of an internal mold releasing agent in a lens-forming composition (or lens formulation), the adhesion between molds and lenses may be reduced, a relatively smaller force may be required to separate mold, and lenses may be removed from molds with less effort. A portion of the internal mold releasing agent need migrate to the interface between the lens-forming composition and the mold in order to be effective to reduce the adhesion between molds and lenses. However, the migration speed of the internal mold releasing agent from the lens-forming composition to the interface between the lens-forming composition and the mold may not be fast enough to effectively reduce the adhesion between molds and lenses.

Therefore, there is a need for an improved method for making contact lenses, in which mold separation force and lens-mold adhesion can be substantially reduced so as to achive higher lens quality and higher production yield.

SUMMARY OF THE INVENTION

In accomplishing the foregoing, the present invention provides a method for producing ophthalmic lenses (in particular, contact lenses) at an improved production yield. The method comprises the steps of: (1) obtaining a fluid lens-forming composition and a mold, wherein the fluid lens-forming composition comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof, wherein the mold has a first mold half with a first molding surface defining the anterior surface of a contact lens and a second mold half with a second molding surface defining the posterior surface of the ophthalmic lens, wherein said first and second mold halves are configured to receive each other such that a cavity is formed between said first and second molding surfaces; (2) applying a coating of an aqueous catanionic solution containing a cationic surfactant and an anionic surfactant onto the first molding surface and/or the second molding surface, wherein the weight percentage ratio of the anionic surfactant over the cationic surfactant in the aqueous solution is from about 0.1 to about 10 (preferably from about 0.25 to about 8, more preferably from about 0.4 to about 2.5); (3) drying the coating of the aqueous catanionic solution to form a coat of catanionic vesicles on the first and/or second molding surface, wherein the formation of the coat of the catanionic vesicles on the first and/or second molding surfaces is characterized by having a percentage of reduction in mold separation force of at least about 50% (preferably at least about 55%, more preferably at least about 60%, even more preferably at least about 65%) relative to a control mold without any coat of catanionic vesicles thereon and optionally but preferably by having at most about 10 (preferably at most about 7, more preferably at most about 5, even more preferably at most about 3) star-tears per lens on average, when being used in cast molding of ophthalmic lenses from the fluid lens-forming composition; (4) introducing the fluid lens-forming composition into the cavity formed by the first and second molding surfaces with the coat of the catanionic vesicles formed in step (3) thereon; (5) actinically irradiating the fluid lens-forming composition in the cavity to form the ophthalmic lens; and (6) opening the mold and removing the formed ophthalmic lens from the mold.

The present invention also provides ophthalmic lenses (preferably contact lenses, more preferably silicone hydrogel contact lenses) produced according to a method of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least 0.1% by weight at room temperature (i.e., a temperature of about 20° C. to about 30° C.).

The term "insoluble", in reference to a compound or material in a solvent, means that the compound or material can be maximally dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

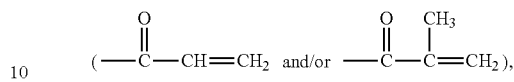

allyl, vinyl

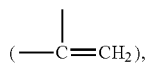

styrenyl, or other C=C containing groups.

The term "(meth)acrylamide" refers to methacrylamide and/or acrylamide.

The term "(meth)acrylamido" refers to an ethylenically-unsaturated group of

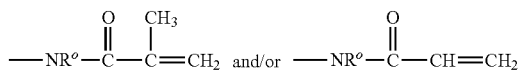

in which $R^o$ is hydrogen or $C_1$-$C_{10}$-alkyl.

As used in this application, the term "(meth)acrylamide-type monomer" refers to a vinylic monomer containing one (meth)acrylamido group.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment and/or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

An "average contact angle" refers to a water contact angle (static water contact angle measured by Sessile Drop), which is obtained by averaging at least 3 measurements.

A "surfactant" is a material that can greatly reduce the surface tension of water at low concentrations (e.g., reducing the surface tension of water to about 40 dynes/cm or less, preferably about 30 dynes/cm or less, even more preferably about 20 dynes/cm, most preferably about 10 dynes/cm at a concentration of about 0.1% by weight or less) and possesses the capability of forming aggregates in water. Typically, a surfactant is an amphiphilic molecule consisting of a water-soluble part (hydrophilic or polar head group) and an oil-soluble part (hydrophobic or non-polar tail group). Surfactants are usually classified according to the nature of their head groups: anionic and cationic surfactants have negatively and positively charged headgroups, respectively; zwitterionic surfactants are both positively and negatively charged; nonionic surfactants carry no charge.

An "aqueous catanionic solution" refers to an aqueous solution comprising a mixture of at least one anionic surfactant and at least one cationic surfactant (i.e., catanionic mixture).

"Catanionic vesicles" are unilaminar vesicles formed spontaneously from oppositely charged surfactants, anionic surfactants and cationic surfactants, largely due to synergetic interactions between the oppositely charged surfactants.

A "percentage of reduction in mold separation force" or "$R_{MSF}$ % T" is calculated by the following formula $$R_{MSF}\ \% = \frac{MSF_o - MSF_{coat}}{MSF_o} \times 100$$

in which $MSF_{coat}$ is the averaged mold separation force measured with molds with a coat of catanionic vesicles; $MSF_o$ is the averaged mold separation force measured with molds without coat of catanionic vesicles as control, when being used in cast molding of ophthalmic lenses (preferably contact lenses) from a fluid lens-forming composition.

The term "mold separation force" as used herein refers to a force required for separating a mold after casting molding a contact lens from a lens-forming composition in the mold. Mold separation force is proportional to adhesion between a mold and a lens cast-molded therein.

An "averaged mold separation force" refers to a value obtained by averaging at least 3, preferably at least 5, more preferably at least 10, independent measurements of mold separation force (i.e., 10 testing samples).

A "star-tear" is referred to a star-shape tear consisting of tearing lines radiating outwardly from one point and are observed on a lens surface under an Optispec microscope to have a dimension of 2.5 mm×2.5 mm or smaller at 13-time magnification.

A "molding surface" of a mold half of a mold refers to a mold half's surface which is in direct contact with a lens-forming composition.

In general, the invention is directed to a method for producing ophthalmic lenses, preferably contact lenses, more preferably silicone hydrogel contact lenses. A method of the invention is characterized by minimizing lens defects generated during mold opening and de-molding process.

The invention is partly based on the discovery that substantial reduction of mold separation force in cast molding of silicone hydrogel contact lenses from a silicone hydrogel lens-forming composition can be achieved by applying a coat of catanionic vesicles on the molding surfaces of a mold (in particular, a glass or quartz mold) and that lens defects (e.g., partially or completely torned lenses, star tears per lens) derived from mold opening and lens removal from a mold can be substantially reduced or eliminated. By using such method, one can increase the product yield and lens quality.

Although the inventors do not wish to be bound by any particular theory, it is believed that an relatively-intact and stable coat of catanionic vesicles can be formed by applying a thin film of an aqueous catanionic solution (containing both at least one anionic surfactant and at least one catanioc surfactant) onto the molding surface of the mold and drying the aqueous catanionic solution on the mold surfaces. Such a coat is believed to be composed on one or more bilayers of catanionic surfactant molecules (mixed anionic and cationic surfactant molecules) and to be stable sufficiently to remain intact during the step of introducing a fluid lens-forming composition into the mold. This coat may effectively prevent lens material interacting with the mold surfaces. For example, glass mold surfaces generally contain silanol groups which can form hydrogen bonding with the hydrophilic components or moieties of a lens materials (e.g., hydrophilic monomeric units including N,N-dimethylacrylamide or N-vinylpyrrolidone, amide bonds, urethane bonds, etc.). The hydrogen bonds formed between mold surfaces and a lens material would result in strong adhension between the molded lens and the mold, i.e., high mold separation force. Further, because of their small averaged molecular weight (less than 3000 daltons), catanionic surfactant molecules in the coat would be too small for them to be entangled with the polymer matrix of the lens material, so as not to effectively become the integral parts of the lens material and thereby not to increase the adhesion between the lens material and the mold surfaces. In addition, the intactness of the coat of catanionic vesicles can be important in producing ophthalmic lenses (preferably contact lenses, more preferably silicone hydrogel contact lenses) with consistently and relatively high lens quality (i.e., with minimal or no micro-tears). It is believed that when the molding surface is not covered with an intact coat (e.g., broken areas, holes, and/or micro-holes), localized lens-to-mold adhesion in those defected areas can may cause lens defects such as star tears or large tears during mold opening and lens removal processes. A coat of catanionic vesicles of the invention is believed to be substantially free of such defects and thereby can enhance the quality of lenses to be produced (e.g., minimal number of star tears per lens on average).

The present invention provides a method for producing ophthalmic lenses (preferably contact lenses, more preferably silicone hydrogel contact lenses). The method comprises the steps of: (1) obtaining a fluid lens-forming composition and a mold, wherein the fluid lens-forming composition comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof, wherein the mold has a first mold half with a first molding surface defining the anterior surface of a contact lens and a second mold half with a second molding surface defining the posterior surface of the ophthalmic lens, wherein said first and second mold halves are configured to receive each other such that a cavity is formed between said first and second molding surfaces; (2) applying a coating of an aqueous catanionic solution containing a cationic surfactant and an anionic surfactant onto the first molding surface and/or the second molding surface, wherein the weight percentage ratio of the anionic surfactant over the cationic surfactant in the aqueous solution is from about 0.1 to about 10 (preferably from about 0.25 to about 8, more preferably from about 0.4 to about 2.5); (3) drying the coating of the aqueous catanionic solution to form a coat of catanionic vesicles on the first and/or second molding surface, wherein the formation of the coat of the catanionic vesicles on the first and/or second molding surfaces is characterized by having a percentage of reduction in mold separation force of at least about 50% (preferably at least about 55%, more preferably at least about 60%, even more preferably at least about 65%) relative to a control mold without any coat of catanionic vesicles thereon and optionally but preferably by having at most about 10 (preferably at most about 7, more preferably at most about 5, even more preferably at most about 3) star-tears per lens on average, when being used in cast molding of ophthalmic lenses from the fluid lens-forming composition; (4) introducing the fluid lens-forming composition into the cavity formed by the first and second molding surfaces with the coat of the catanionic vesicles formed in step (3) thereon; (5) actinically irradiating the fluid lens-forming composition in the cavity to form the ophthalmic lens; and (6) opening the mold and removing the formed ophthalmic lens from the mold.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

Any suitable silicone-containing vinylic monomers can be used in the invention. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate; trimethylsilylmethyl vinyl carbonate; siloxane-containing vinylic monomers each having an alkylbis(alkyldimethylsilyloxy)-silylalkyl group or a linear oligo-dimethylsiloxane chain having 3 to 10 dimethylsiloxane units as disclosed in U.S. provisional patent application No. 61/884,176 (incorporated by reference in its entirety), siloxane-containing vinylic monomers disclosed in U.S. patent application Nos. 61/737,181, 61/737,206.

A class of preferred silicone-containing vinylic monomers is polysiloxane-containing vinylic monomers. Examples of such polysiloxane-containing vinylic monomers include without limitation monomethacrylated or monoacrylated polydimethylsiloxanes of various molecular weight (e.g., mono-3-methacrylamidopropyl terminated, mono-butyl terminated polydimethylsiloxane or mono-(3-(meth)acryloxy-2-hydroxypropyloxy)propyl terminated, mono-butyl terminated polydimethylsiloxane).

Examples of silicone-containing crosslinkers include without limitation dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N, N, N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties); polysiloxane-containing crosslinkers disclosed in U.S. patent application publication No. 61/737,187 and Ser. No. 13/253,171 (both of which are incorporated by references in their entireties).

Examples of preferred silicon-containing prepolymers comprise hydrophilic segments and hydrophobic segments. Examples of such silicone-containing prepolymers include those described in commonly-owned U.S. Pat. Nos. 6,039,913, 7,091,283, 7,268,189, 7,238,750, 7,521,519, 8,557,940; commonly-owned US patent application publication Nos. US 2008-0015315 A1, US 2008-0143958 A1, US 2008-0143003 A1, US 2008-0234457 A1, US 2008-0231798 A1, US 2012-0088843 A1, US 2012-0088844 A1, and US 2012-0088861 A1 (all of which are incorporated herein by references in their entireties).

Examples of preferred hydrophilic (silicone-free) prepolymers include, but are not limited to, a water-soluble crosslinkable poly(vinyl alcohol) prepolymer described in U.S. Pat. Nos. 5,583,163 and 6,303,687 (incorporated by reference in their entireties); a water-soluble vinyl group-terminated polyurethane prepolymer described in U.S. Patent Application Publication No. 2004/0082680 (herein incorporated by reference in its entirety); derivatives of a polyvinyl alcohol, polyethyleneimine or polyvinylamine, which are disclosed in U.S. Pat. No. 5,849,841 (incorporated by reference in its entirety); a water-soluble crosslinkable polyurea prepolymer described in U.S. Pat. No. 6,479,587 and in commonly owned pending U.S. patent application Ser. No. 10/991,124 filed on Nov. 17, 2004 (herein incorporated by reference in their entireties); crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; and crosslinkable polyallylamine gluconolactone prepolymers disclosed in PCT patent application WO 2000/31150 and U.S. Pat. No. 6,472,489.

A fluid lens-forming composition can also comprise a hydrophobic monomer, a crosslinking agent (i.e., a compound with two or more acryl groups and with a molecular weight less than 700 Daltons), a free-radical initiator (e.g., photoinitiator or thermal initiator), a visibility tinting agent (e.g., dyes, pigments, or mixtures thereof), UV-blocking (absorbing) agent, photosensitizers, inhibitors, an antimicrobial agent (e.g., preferably silver nanoparticles or stabilized silver nanoparticles), bioactive agent, leachable lubricants, eye-tear-stabilizing agents, fillers, or combinations thereof, as known to a person skilled in the art.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred cross-linking agents include without limitation tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane tri methacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide,1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis (trimethylsiloxy)disiloxane, 1,3-bis (methacryloxyethylureidopropyl)-1,1,3,3-tetrakis (trimethylsiloxy)disiloxane, and combinations thereof. A preferred cross-linking agent is tetra(ethyleneglycol) diacrylate, tri(ethyleneglycol) diacrylate, ethyleneglycol diacrylate, di(ethyleneglycol) diacrylate, methylenebisacrylamide, triallyl isocyanurate, or triallyl cyanurate. The amount of a cross-linking agent used is expressed in the weight content with respect to the total polymer and is preferably in the range from about 0.05% to about 4%, and more preferably in the range from about 0.1% to about 2%.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, and Germane-based Norrish Type I photoinitiators which are capable of initiating a free-radical polymerization under irradiation with a light source including a light in the region of about 400 to about 550 nm. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Examples of Germane-based Norrish Type I photoinitiators are acylgermanium compounds described in U.S. Pat. No. 7,605,190 (herein incorporated by reference in its entirety). Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Any suitable polymerizable UV-absorbing agents can be used in the invention. Preferably, a polymerizable UV-absorbing agent comprises a benzotriazole-moiety or a benzophenone-moiety. Examples of preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N-N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 1,00,000.

Examples of leachable eye-tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, an eye-tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a fluid lens-forming composition can be a solution or a melt at a temperature from about 20° C. to about 85° C. Preferably, a composition is a solution of all desirable components in a suitable solvent, or a mixture of suitable solvents.

A fluid lens-forming composition can be prepared by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, the solvent is Preferably, a mixture of lens-forming materials is a solution of all the desirable components in water, 1,2-propylene glycol, a polyethyleneglycol having a molecular weight of about 400 Daltons or less, dipropylene glycol methyl ether, or a mixture thereof.

Numerous silicone hydrogel lens formulations have been described in numerous patents and patent applications published by the filing date of this application. All of them can be used in obtaining a preformed SiHy lens which in turn becomes the inner layer of a SiHy contact lens of the invention, so long as they will yield a SiHy material having a Dk and water content specified above. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in making preformed SiHy contact lenses (the inner layer of a SiHy contact lens of the invention).

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the lens-forming composition is cured actinically under a spatial limitation of actinic radiation to form a SiHy contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, an aqueous catanionic solution comprises a cationic surfactant and an anionic surfactant.

Examples of preferred anionic surfactants include without limitation salts (e.g., sodium, potassium or ammonium salts) of $C_5$-$C_{18}$ alkyl sulfates, salts (e.g., sodium, potassium or ammonium salts) of $C_5$-$C_{18}$ alkyl sulfonates, salts (e.g., sodium, potassium or ammonium salts) of $C_5$-$C_{18}$ alkyl benzene sulfonates, N—$C_8$-$C_{20}$ acyl sarcosinate salts ($RCON(CH_3)CH_2COO^-M^+$ in which R is $C_8$-$C_{20}$ alkyl and M+ is sodium, potassium or ammonium ion), and combinations thereof. More preferably, an anionic surfactant is a salt of a $C_5$-$C_{18}$ alkyl sulfate or sulfonate. Even more preferably, an anionic surfactant is a salt of a $C_5$-$C_{14}$ alkyl sulfate or sulfonate.

Examples of preferred cationic surfactants include without limitation $C_8$-$C_{18}$ alkyl-trimethylammonium salts, silicone containing polyquats described in U.S. Pat. No. 4,185,087 (herein incorporated by reference in its entirety), and combination thereof. Preferably, a cationic surfactant is a silicone-containing polyquat of formula (I)

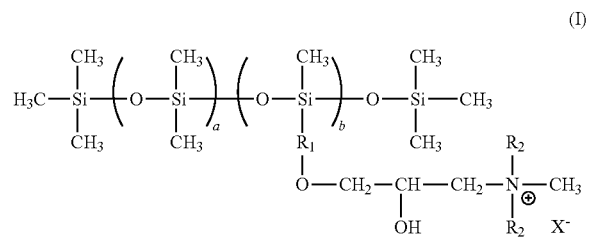

in which $R_1$ is a $C_1$-$C_8$ alkylene divalent radical (preferably propylene divalent radical), $R_2$ is $C_1$-$C_8$ alkyl radical (preferably $C_1$-$C_4$ alkyl radical, more preferably methyl or ethyl radical), $X^-$ is a halogen ion ($Cl^-$, $Br^-$, or $I^-$), a is an integer of from 10 to 50, b is an integer of from 2 to 8. A silicone-containing polyquat of formula (I) can be prepared according to the procedures described in U.S. Pat. No. 4,185,087.

In accordance with the present invention, a coating of an aqueous catanionic solution containing a cationic surfactant and an anionic surfactant can be applied to the molding surface of a mold half by contacting the molding surface with one or more coating solutions according to various methods, such as, for examples those methods disclosed in U.S. Pat. Nos. 6,451,871, 6,719,929, 6,793,973, 6,811,805, 6,896,926, which are incorporated herein by references in their entireties.

Contacting of the molding surface of a mold half with a coating solution can occur by dipping it into the coating solution or by spraying it with the coating solution. One coating process involves solely dip-coating and optionally dip-rinsing steps. Another coating process involves solely spray-coating and spray-rinsing steps. However, a number of alternatives involve various combinations of spray- and dip-coating and rinsing steps may be designed by a person having ordinary skill in the art.

The immersion time for each of the coating and optional rinsing steps may vary depending on a number of factors. Preferably, immersion of the mold into a coating solution occurs over a period of about 1 to 30 minutes, more preferably about 1 to 20 minutes, and most preferably about 1 to 5 minutes. Rinsing may be accomplished with a plurality of rinsing steps, but a single rinsing step, if desired, can be quite efficient.

The spray coating application may be accomplished via a process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process; and a computer system capable of controlling the positioning of the dispensing head of the spraying device on the ophthalmic lens and dispensing the coating liquid. Those spraying coating processes are described in U.S. Pat. No. 6,811,805.

The step of drying the coating can be carried out according to any methods known to a person skilled in the art. Preferably, the drying step is carried out under the stream of an inert gas (e.g., nitrogen).

The fluid lens-forming composition can be introduced (dispensed) into a cavity formed by a mold according to any known methods.

A person skilled in the art will know well how to cast mold lenses from a polymerizable material in molds based on thermal or actinic polymerization.

After the fluid lens-forming composition is dispensed into the mold, polymerization/crosslinking can be initiated actinically, by means of actinic radiation, such as UV/visible light irradiation, ionizing radiation (e.g., gamma or X-ray irradiation).

In a preferred embodiment, reusable molds are used and the fluid composition is cured actinically under a spatial limitation of actinic radiation to form a contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

Opening of the mold so that the molded lens can be removed from the mold may take place in a manner known to a person skilled in the art.

The molded lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In accordance with the invention, an ophthalmic lens produced according to a method of the invention is preferably a contact lens, more preferably a silicone hydrogel contact lens.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Mold Separation Force Measurement

Mold separation force is measured using Zwick tensile test machine (Zwick Z 2.5) and a mold assembly which is disclosed in detail in U.S. Pat. No. 6,203,909 B1 (herein incorporated by reference in its entirety). Re-usable Lightstream molds (designed according U.S. Pat. No. 6,800,225) each comprise a female mold half made of glass and a male mold half made of quartz. The female mold half of one mold assembly is mounted rigidly onto the bottom of the machine, the male mold half is attached to the machine with a cardanic suspension device to enable force-free alignment.

Assessment of Quality of Molded Lenses

The quality of molded lenses is inspected under an Optispec microscope at 13× magnification. If a lens is torn apart or has a tearing line longer than 2.5 mm (at 13× magnification) during mold opening and lens removal processes, it fails the lens quality inspection. If a lens remains intact and/or free of any tearing line long than 2.5 mm (at 13× magnification) after mold opening and lens removal processes, the quality of the molded lenses is assessed by counting the number of star tears.

Water Contact Angle

Water contact angles on a molding surface of a mold half are measured using a VCA 2500 XE contact angle measurement device from AST, Inc., located in Boston, Massachusetts. This equipment is capable of measuring advancing or receding contact angles or sessile (static) contact angles. A mold half with its molding surface facing up is mounted on the contact angle measurement pedestal and the sessile drop contact angle is automatically measured using the software provided by the manufacturer. The DI water used for measuring the contact angle has a resistivity >18 MΩcm and the droplet volume used is 2 µl.

EXAMPLE 2

A: Chain-Extended PDMS Cross-Linker with Pendant p(DMA) Chains

Synthesis of α,α'-dihydroxy terminated pDMA-(OH)$_2$

Mono-dihydroxyl terminated poly(N,N-dimethylacrylamide) (poly(DMA)) is prepared by radical polymerization using 3-mercapto-1,2-propanediol as chain transfer reagent, as shown in the following scheme

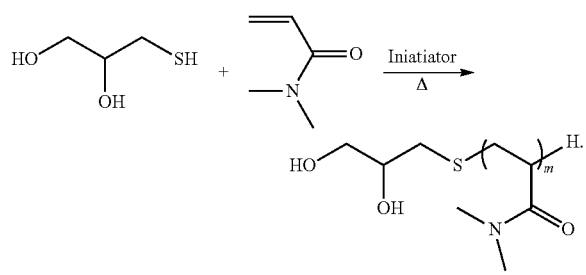

The chain transfer agent not only introduces the hydroxyl groups but also control the molecular weight of the polymer.

DMA (44.410 g, 448 mol), AIBN (0.184 g, 1.12 mol), 3-mercapto-1,2-propanediol (6.687 g, 61.8 mmol), ethyl acetate (10.2 g) and toluene (102.6 g) were introduced into a 500 mL Jacketed Reactor equipped with a condenser, overhead stirrer, and gas dispense tube. The solution was purged with $N_2$ gas for 30 min at room temperature, before it was heated to 58° C. After reaction for 50 mins, the solution was purged with air and immediately siphoned to a flask immersed in an ice bath. GC and GPC samples were taken at the beginning and end of the reaction for determining monomer conversion and molecular weight, respectively. The reaction solution was then concentrated to about 70 g using rotavap under vacuum at 30° C. before being slowly added to 800 mL of hexanes with stirring. After the addition was complete, the solution settled down for 10 mins without stirring and the supernatant liquid was decanted. 100-150 mL of THF was added to dissolve the polymer and the solution was then concentrated to about 70 g using the roatvap. The purification process was repeated two more times. The polymer solution in THF was then solvent exchanged to toluene and transferred to an amber bottle. The final weight of the solution was adjusted to 90 g by adding toluene. In the end, 10 g of ethyl acetate was added to this solution. To obtain enough pDMA for reactions, several different batches of pDMA solution were combined. The solid content of the solution was measured by gravimetric method. OH content of the polymer was determined by titration.

Preparation of Stock Solution of (pDMA-(OH)$_2$) and HO-PDMS-OH

α,ω-dihydroxy PDMS (α,ω-dihydroxy polydimethylsiloxane) was dried under vacuum at 60° C. overnight. The proper amount of PDMS was added to the above prepared pDMA solution to obtain a pDMA/PDMS stock solution. Molecular sieve (4 Å) was added to the stock solution. The OH content of the solution was determined by OH titration.

B. Synthesis of pDMA Grafted PDMS Macromer

A chain-extended PDMS cross-linker with pendant 40% by weight of p(DMA) chains was prepared. Prior to synthesis, a 200 mL Schlenk flask, stir bar, and gas tight syringes were oven dried overnight. 50.46 g pDMA/PDMS stock solution (28.36 wt % pDMA and 26.71% PDMS in a toluene and ethyl acetate mixture ((90/10 v/v toluene/ethyl acetate), 1.371 meq/g OH of the solution) and 27.5 g of toluene were added into the flask. 26-28 g of solvent from the flask was stripped off under vacuum at 80° C. After the flask was backfilled with $N_2$, 26 g of dry toluene was added using the airtight syringe. The solution was vacuum stripped again to remove 26-28 g of solvent, followed by backfill with $N_2$. The final solution weight was recorded as X. The flask was then put on an oil bath at 40° C. 0.3 g sample was taken for Karl Fischer titration. The needed amount of HMDI was calculated based on the equation below:

$$HMDI(g) = 1.10 \times \frac{[(X - wt.KarlFisherSample) \times 69.232/X]}{11.891}$$

HMDI was added to the reactions solution with the gas-tight syringe, followed by addition of 5.609 g of dry ethyl acetate. 3 drops of catalyst (DBTDL) were added with a second, clean & dry syringe. The solution was mixed for 3 hours before the flask was removed out of the oil bath and cooled to room temperature. The required amount of HEAA was then added with additional 3 drops of catalyst. The reaction continues overnight.

$$HEAA(g)=(76.155-69.232)*1.4)/8.69$$

After synthesis, the above solution from A-3 was concentrated to 30 g using rotavap at 30° C. It was then diluted with 400mL of 1-propanol and filtered through 1 um glass microfiber filter. The solvent exchange from 1-propanol to water was achieved via azeotropic distillation. The final concentration of the solution is adjusted to around 5% before it was then ultra-filtered using 3 k MW cutoff cassette. 50 L of de-ionized water was used for this ultrafiltration. The collected filtrate was freeze-dried.

C. Lens Formulations

Formulation A was prepared by adding 32.2190 g of macromer, 2.929 g of 6% Irgacure 2959 solution in DPGME (dipropylene glycol methyl ether), and 23.432 g DPGME in a speed-mixer cup, followed by speed mixing. A homogenous final formulation was obtained, containing 55% of macromer by weight. G' (storage modulus) determined by photo-rheology was 80 KPa.

Formulation B was prepared by adding 49.0035 g, 4.4500 g of 6% Irgacure 2959 solution in DPGME, and 35.6470 g DPGME, followed by speed mixing. A homogenous final formulation was obtained, containing 55% of macromer by weight. G' (storage modulus) determined by photo-rheology was 59 KPa.

EXAMPLE 3

A reusuable mold, which consists of a male hald (made of quartz) and a female half (made of glass) and is similar to those described in U.S. Pat. No. 6,800,225, is used in the experiments. As described in Example 1, in order to measure the mold separation force, the female mold half of the mold is mounted rigidly onto the bottom of Zwick tensile test machine, the male mold half is attached to the machine with a cardanic suspension device to enable force-free alignment.

The molding surfaces of the male and female mold halves is sprayed with a solution containing a mold coating agent and then dried under $N_2$ stream in a container (at about 7 bars). A lens formulation (Formulation A) prepared in Example 2 is introduced into the cavity formed between the molding surfaces of the male and female mold halves. After curing, the mold is opened at a speed of about 10 mm/min. The molded lens is rinsed and loosened with DI water. The loosened lens is removed from the mold which is then cleaned with DI water and dried with $N_2$.

Control Experiments

Control experiments ware carried with untreated reusuable mold. Where the untreated mold is used to cast mold lenses from a lens formulation prepared in Example 2, the mold separation force is about 198 Newtons, and all the molded lenses with the untreated mold are torned into pieces.

COMPARATIVE EXAMPLES

Hydrophilic Polymer as Mold Releasing Agents

Two hydrophilic polymers, Carbapol® 907 (a linear polyacrylic acid) and ISP Copolymer 845 ( ), are tested to examine their effects upon reducing the mold separatin force. The cast molding of lenses with the mold treated with a 1% (w/v) of one of the two hydrophilic polymer as mold releasing agent is carried out according to the procedures described above. The mold separation forces are about 204 Newtons and about 183 Newtons respective for Carbopol 907 and ISP Copolymer 845 respectively. All the molded lenses are torned into pieces.

Surfactant as Mold Releasing Agents

Nine anionic surfactants: sodium dodecyl sulfate (SDS), ammonium lauryl sulfate (ALS), sodium octyl sulfate (SOS), sodium 2-ethylhexyl sulfate (SEHS), 7-ethyl-2-methyl-4-undecyl sulfate sodium (EMUSS), sodium dodecyl benzene sulfonate (SDBS), sodium 1-pentane sulfonate monohydrate (SPSM), sodium 1-octane sulfonate monohydrate (SOSM), and N-lauryl sarcosine sodium (LSS), are used in this example.

One zwitterionic surfactant, N,N-dimethyl-N-dodecylglycine betaine (DDGB) is also used in this example.

Two cationic surfactants: hexadecyl trimethyl ammonium bromide (C16TAB) and Silquat D2

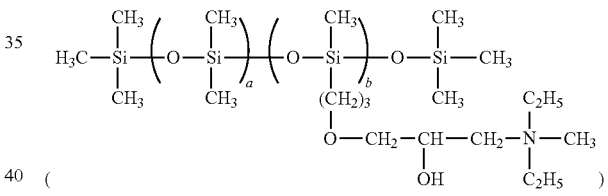

from Siltech, are used in this Example.

Anionic surfactants, cationic surfactants, and catanionic mixtures are tested to examine their effects upon reducing the mold separatin force and the quality of the molded lenses. The cast molding of lenses with the mold treated with an aqueous solution containing a surfactant or a catanionic surfactant mixture as mold releasing agent is carried out according to the procedures described above. The lens formulation prepared in Example 2 (Formulation A) is used in this example. The mold separation forces (MSF) and water contact angles (WCA) of the treated molding surfaces are measured. The results are reported in Table 1.

TABLE 1

| Surfactant Solution | | | | Catanionic Solution | | | |
|---|---|---|---|---|---|---|---|
| Conc. (w/v) | MSF (N) | $R_{MSF}$ | WCA | Conc. (w/v) | MSF (N) | $R_{MSF}$ | WCA |
| 0.75% Silquat D2 | 133 ± 48 | 33% | 52° | | | | |
| 0.9% Silquat D2 | 125 ± 37 | 37% | 39° | | | | |
| 1.5% Silquat D2 | 112 ± 36 | 43% | 18° | 0.83% SDS + 0.04% C16TAB | 135 ± 41 | 32% | 32° |
| 1% C16TAB | 89 ± 10 | 55% | 43° | 1% SDS + 0.25% C16TAB | 94 ± 34 | 52% | 22° |
| 1% SDS | 82 ± 8 | 59% | 19° | 1% SDS + 0.25% Silquat D2 | 60 ± 8.7 | 70% | 19° |
| 1.5% SDS | 66 ± 11 | 67% | 17° | 1.5% SDS + 0.25% Silquat D2 | 55 ± 19 | 72% | 29° |
| 0.75% SDS | 97 ± 23 | 51% | 16° | 0.75% SDS + 0.75% Silquat D2 | 92 ± 12 | 54% | 26° |
| 1% ALS | 174 ± 23 | 12% | 22° | 1% ALS + 0.25% Silquat D2 | 72 ± 34 | 64% | 29° |

TABLE 1-continued

| Surfactant Solution | | | | Catanionic Solution | | | |
|---|---|---|---|---|---|---|---|
| Conc. (w/v) | MSF (N) | $R_{MSF}$ | WCA | Conc. (w/v) | MSF (N) | $R_{MSF}$ | WCA |
| 1% SOS | 132 ± 28 | 33% | 21° | 1% SOS + 0.25% Silquat D2 | 68 ± 18 | 66% | 36° |
| 1% SEHS | 203 | 0 | 25° | 1% SEHS + 0.25% Silquat D2 | 106 ± 30 | 46% | 37° |
| 1.0% EMUSS | 200 ± 13 | 0 | 19° | 1% EMUSS + 0.25% Silquat D2 | 126 ± 45 | 36% | 51° |
| 1% SDBS | 174 ± 31 | 12% | 37° | 1% SDBS + 0.25% Silquat D2 | 137 ± 30 | 31% | 27° |
| 1% SPSM | 63 ± 6 | 68% | 28° | 1% SPSM + 0.25% Silquat D2 | 44 ± 5 | 78% | 52° |
| 1% SOSM | 118 ± 17 | 40% | 25° | 1% SOSM + 0.25% Silquat D2 | 51 ± 9 | 74% | 51° |
| 1% LSS | 69 ± 10 | 65% | 19° | 1% LSS + 0.25% Silquat D2 | 70 ± 14 | 65% | 17° |
| 1% DDGB | 154 | 22% | | 1% DDGB + 0.25% Silquat D2 | 101 ± 50 | 49% | 18° |

Table 1 indicates that no apparent correlation exists between the mold separation force and the water contact angle of the treated molding surface, and that catanionic mixture may have some synergetic effects upon the mold separation force (i.e., minimizing the adhesion between lens material and mold surface). The results show that alkyl sulfate salts and alkyl sulfonate salts are more effective to work together with a cationic surfactant to reduce mold separation force.

EXAMPLE 4

An aqueous catanionic solution (1.00% w/v sodium dodecyl sulfate+0.25% w/v Silquat D2) is further tested to examine the effects of mold treatment with this aqueous catanionic solution upon the quality of molded lenses with molds treated with the catanionic mixture, according to the procedures described in Example 3. It found that with such a catanionic mixture as mold releasing agent for treating molding surfaces prior to dosing a lens formulation, about 98% of moleded lenses have ≤3 star tears/lens (i.e., achieving a high lens quality), using 2 lens formulations (Formulations A and B) prepared in Example 2, 3 reusuable molds, 3 batches of catanionic mixture preparations, 3 different operators on 6 different days.

What is claimed is:
1. A method for making to a contact lens, the method comprising the steps of:
   (1) obtaining a fluid lens-forming composition and a mold, wherein the fluid lens-forming composition comprises at least one material selected from the group consisting of a hydrophilic vinylic monomer, a silicone-containing vinylic monomer, a silicone-containing crosslinker, a silicone-containing prepolymer, a hydrophilic prepolymer free of silicone, and combinations thereof, wherein the mold has a first mold half with a first molding surface for defining the anterior surface of a contact lens and a second mold half with a second molding surface for defining the posterior surface of the contact lens, and wherein said first and second mold halves are configured to receive each other such that a cavity is formed between said first and second molding surfaces;
   (2) applying a coating of an aqueous catanionic solution containing a cationic surfactant and an anionic surfactant onto the first molding surface and/or the second molding surface, wherein the weight percentage ratio of the anionic surfactant over the cationic surfactant in the aqueous solution is from about 0.1 to about 10, wherein the anionic surfactant is a salt of a $C_5$-$C_{18}$ alkyl sulfate, a salt of a $C_5$-$C_{18}$ alkyl sulfonate, or a combination thereof, and wherein the cationic surfactant is a silicone-containing polyquat;
   (3) drying the coating of the aqueous catanionic solution to form a coat of catanionic vesicles on the coated first and/or second molding surface;
   (4) introducing the fluid lens-forming composition into the cavity formed by the first and second molding surfaces, the first and/or second molding surfaces having the coat of the catanionic vesicles formed thereon;
   (5) actinically irradiating the fluid lens-forming composition in the cavity to form the contact lens; and
   (6) opening the mold and removing the formed contact lens from the mold, wherein the formation of the coat of the catanionic vesicles on the first and/or second molding surfaces is characterized by having a percentage of reduction in mold separation force of at least about 50% between the mold and the formed lens relative to a control mold without any releasing coating thereon.

2. The method of claim 1, wherein the coating of the aqueous catanionic solution is applied onto the first and second molding surfaces of the mold, wherein the weight percentage ratio of the anionic surfactant over the cationic surfactant in the aqueous solution is from about 0.25 to about 8, and wherein the formation of the coat of the catanionic vesicles on the first and second molding surfaces is characterized by having a percentage of reduction in mold separation force of at least about 55% between the mold and the formed lens relative to a control mold without any releasing coating.

3. The method of claim 2, wherein the anionic surfactant is a salt of a $C_5$-$C_{14}$ alkyl sulfate or sulfonate.

4. The method of claim 3, wherein the cationic surfactant is represented by formula (I)

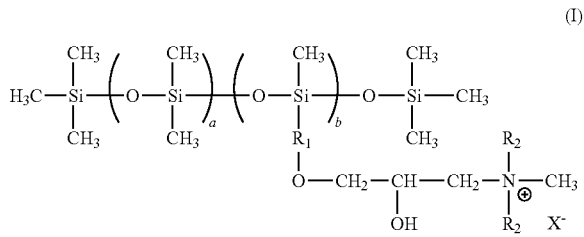

in which $R_1$ is a $C_1$-$C_8$ alkylene divalent radical, $R_2$ is a $C_1$-$C_8$ alkyl radical, $X^-$ is a halogen ion, a is an integer of from 10 to 50, and b is an integer of from 2 to 8.

5. The method of claim 4, wherein the mold is a reusable mold.

6. The method of claim 4, wherein in the cationic surfactant of formula (I), $R_1$ is propylene divalent radical and $R_2$ is methyl or ethyl.

7. The method of claim 6, wherein the step of applying the coating of the aqueous catanionic solution is carried out by spraying the catanionic solution onto the first and second molding surfaces of the mold.

8. The method of claim 7, wherein the step of drying the coating of the aqueous catanionic solution is carried out under a $N_2$ stream.

9. The method of claim 1, wherein the anionic surfactant is a salt of a $C_5$-$C_{14}$ alkyl sulfate or sulfonate.

10. The method of claim 9, wherein the cationic surfactant is represented by formula (I)

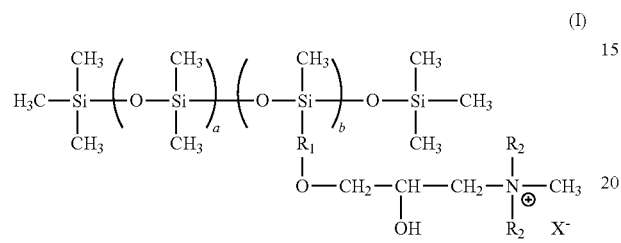

(I)

in which $R_1$ is a $C_1$-$C_8$ alkylene divalent radical, $R_2$ is a $C_1$-$C_8$ alkyl radical, $X^-$ is a halogen ion, a is an integer of from 10 to 50, and b is an integer of from 2 to 8.

11. The method of claim 10, wherein in the cationic surfactant of formula (I), $R_1$ is propylene divalent radical and $R_2$ is methyl or ethyl.

12. The method of claim 11, wherein the step of applying the coating of the aqueous catanionic solution is carried out by spraying the catanionic solution onto the first and second molding surfaces of the mold.

13. The method of claim 12, wherein the step of drying the coating of the aqueous catanionic solution is carried out under a $N_2$ stream.

14. The method of claim 13, wherein the mold is a reusable mold.

15. The method of claim 1, wherein the mold is a reusable mold.

* * * * *